United States Patent
Poon et al.

(10) Patent No.: US 9,591,905 B2
(45) Date of Patent: *Mar. 14, 2017

(54) PROTECTIVE CASE FOR AN ELECTRONIC DEVICE

(71) Applicant: Thule Organization Solutions, Inc., Niwot, CO (US)

(72) Inventors: Tony Poon, Shanghai (CN); Craig R. Norman, Longmont, CO (US)

(73) Assignee: Thule Organization Solutions, Inc., Niwot, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/162,303

(22) Filed: May 23, 2016

(65) Prior Publication Data
US 2016/0262514 A1    Sep. 15, 2016

Related U.S. Application Data

(63) Continuation of application No. 14/585,639, filed on Dec. 30, 2014, now Pat. No. 9,382,033, which is a (Continued)

(51) Int. Cl.
*A45C 11/00* (2006.01)
*A45C 11/24* (2006.01)
(Continued)

(52) U.S. Cl.
CPC .............. *A45C 11/24* (2013.01); *A45C 11/00* (2013.01); *B65B 5/00* (2013.01); *B65D 5/5206* (2013.01);
(Continued)

(58) Field of Classification Search
CPC ... A45C 11/00; A45C 2011/003; A47B 41/06; B65B 5/00; B65D 5/00; B65D 5/52;
(Continued)

(56) References Cited

U.S. PATENT DOCUMENTS

| 484,653 A | 10/1892 | Clerk |
| 764,765 A | 7/1904 | Rand |

(Continued)

FOREIGN PATENT DOCUMENTS

| DE | 202014101951 | 5/2014 |
| EP | 2564722 | 3/2013 |

(Continued)

OTHER PUBLICATIONS

"MiniSuit Orbit 360 Rotating Stand Case for Apple iPad Devices," Amazon.com, 2012, 5 pages.
(Continued)

*Primary Examiner* — Bryon Gehman
(74) *Attorney, Agent, or Firm* — Sheridan Ross P.C.

(57) ABSTRACT

A protective case for accommodating a number of variable sized electronic devices is provided. The case comprises internal features including rigid support members and biasing members for securing an electronic device and allowing the selective orientation and positioning of the electrical device for optimizing viewing.

20 Claims, 12 Drawing Sheets

Related U.S. Application Data continuation of application No. 13/722,167, filed on Dec. 20, 2012, now Pat. No. 8,925,722.

(60) Provisional application No. 61/579,264, filed on Dec. 22, 2011.

(51) Int. Cl.
| | |
|---|---|
| *F16M 11/04* | (2006.01) |
| *F16M 11/10* | (2006.01) |
| *B65B 5/00* | (2006.01) |
| *F16M 13/00* | (2006.01) |
| *B65D 5/52* | (2006.01) |

(52) U.S. Cl.
CPC ........... *F16M 11/041* (2013.01); *F16M 11/10* (2013.01); *F16M 13/00* (2013.01); *A45C 2011/003* (2013.01); *A45C 2200/15* (2013.01)

(58) Field of Classification Search
CPC ...... B65D 5/5206; B65D 85/00; F16M 11/04; F16M 11/041; F16M 11/10; F16M 13/00
USPC ............ 206/45.24, 320, 472; 248/456, 465.1
See application file for complete search history.

(56) References Cited

U.S. PATENT DOCUMENTS

| | | | |
|---|---|---|---|
| 1,037,024 | A | 8/1912 | Krumming |
| 1,613,536 | A | 1/1927 | Rose |
| 2,390,125 | A | 12/1945 | Stanley |
| 2,490,356 | A | 12/1949 | Hummel |
| 2,505,743 | A | 4/1950 | Rose |
| 2,537,135 | A | 1/1951 | Hempel |
| 3,041,774 | A | 7/1962 | Walker |
| 3,334,920 | A | 8/1967 | Orth |
| D230,376 | S | 2/1974 | Andrew |
| 4,213,520 | A | 7/1980 | Sarna et al. |
| 4,259,568 | A | 3/1981 | Dynesen |
| 4,544,123 | A | 10/1985 | Peacock |
| 4,555,128 | A | 11/1985 | White et al. |
| 5,607,054 | A | 3/1997 | Hollingsworth |
| D396,489 | S | 7/1998 | Siemon et al. |
| D420,385 | S | 2/2000 | Inbert |
| 6,155,602 | A | 12/2000 | Mylander et al. |
| 6,308,988 | B1 | 10/2001 | Mylander et al. |
| 6,772,879 | B1 | 8/2004 | Domotor |
| D523,473 | S | 6/2006 | Raegala |
| 7,184,263 | B1 | 2/2007 | Maskatia |
| 7,281,698 | B2 | 10/2007 | Patterson, Jr. |
| 7,414,833 | B2 | 8/2008 | Kittayapong |
| 7,540,378 | B2 | 6/2009 | Gallagher |
| 7,573,703 | B2 | 8/2009 | Chuang et al. |
| 7,735,644 | B2 | 6/2010 | Sirichai et al. |
| 7,828,260 | B2 * | 11/2010 | Hauser ................. A47B 23/043 248/456 |
| D658,186 | S | 4/2012 | Akana et al. |
| D658,188 | S | 4/2012 | Diebel |
| D659,139 | S | 5/2012 | Gengler |
| D663,304 | S | 7/2012 | Akana et al. |
| 8,230,992 | B2 | 7/2012 | Law et al. |
| 8,245,843 | B1 | 8/2012 | Wu |
| 8,281,924 | B2 * | 10/2012 | Westrup ................... A45C 3/02 206/320 |
| 8,312,991 | B2 * | 11/2012 | Diebel ................... A45C 11/00 206/320 |
| D671,948 | S | 12/2012 | Akana et al. |
| D672,353 | S | 12/2012 | Liu |
| D672,781 | S | 12/2012 | Lu |
| D673,159 | S | 12/2012 | McCarthy et al. |
| 8,328,008 | B2 * | 12/2012 | Diebel ................... A45C 11/00 206/320 |
| D674,798 | S | 1/2013 | Kim et al. |
| D674,800 | S | 1/2013 | Kim |
| D675,210 | S | 1/2013 | Kim |
| D675,624 | S | 2/2013 | Wibby et al. |
| D675,625 | S | 2/2013 | Hasbrook et al. |
| D675,627 | S | 2/2013 | Rouser |
| D676,449 | S | 2/2013 | Probst et al. |
| D678,260 | S | 3/2013 | Bau |
| D679,278 | S | 4/2013 | Cho et al. |
| D679,279 | S | 4/2013 | Yang et al. |
| D680,120 | S | 4/2013 | Cho et al. |
| 1,679,715 | A1 | 4/2013 | Akana at al. |
| 8,424,830 | B2 | 4/2013 | Yang et al. |
| D681,641 | S | 5/2013 | Van Den Nieuwenhuizen et al. |
| D682,836 | S | 5/2013 | Akana et al. |
| D682,838 | S | 5/2013 | Akana et al. |
| D683,141 | S | 5/2013 | Symons |
| 8,479,915 | B2 * | 7/2013 | Chen .................... G06F 1/1626 206/320 |
| D687,438 | S | 8/2013 | Lu |
| D690,305 | S | 9/2013 | Wen |
| D690,702 | S | 10/2013 | Chung |
| D691,142 | S | 10/2013 | Diebel |
| D692,434 | S | 10/2013 | Kim |
| 8,567,740 | B2 * | 10/2013 | Tarnutzer ............. A47B 23/043 248/456 |
| D693,823 | S | 11/2013 | Chen et al. |
| D695,296 | S | 12/2013 | Hsu |
| D696,253 | S | 12/2013 | Akana et al. |
| D696,256 | S | 12/2013 | Piedra et al. |
| D696,669 | S | 12/2013 | Akana et al. |
| 8,607,976 | B2 * | 12/2013 | Wu ....................... G06F 1/1626 206/320 |
| 8,640,864 | B2 | 2/2014 | Chen et al. |
| 8,651,446 | B2 * | 2/2014 | Lausell ................ F16M 11/041 248/465.1 |
| 8,657,112 | B2 | 2/2014 | Igarashi |
| D701,205 | S | 3/2014 | Akana et al. |
| D702,673 | S | 4/2014 | Murchison et al. |
| D704,689 | S | 5/2014 | Chang |
| D704,693 | S | 5/2014 | Kim |
| D706,270 | S | 6/2014 | Akana et al. |
| D706,783 | S | 6/2014 | Almodova |
| D707,229 | S | 6/2014 | Almodova |
| 8,757,375 | B2 | 6/2014 | Huang |
| D708,838 | S | 7/2014 | Lee |
| 8,763,795 | B1 | 7/2014 | Oten et al. |
| 8,766,921 | B2 | 7/2014 | Ballagas et al. |
| 8,773,353 | B2 | 7/2014 | Wei |
| 8,780,535 | B2 | 7/2014 | Mongan et al. |
| 8,783,458 | B2 | 7/2014 | Gallagher et al. |
| D710,859 | S | 8/2014 | Mecchella et al. |
| 8,797,132 | B2 | 8/2014 | Childs et al. |
| 8,910,915 | B2 * | 12/2014 | Wibby ................... A45C 11/00 206/45.2 |
| 8,925,722 | B2 | 1/2015 | Poon et al. |
| D731,495 | S | 6/2015 | Hassett |
| D732,542 | S | 6/2015 | Hassett |
| 9,095,194 | B2 | 8/2015 | Hassett |
| D740,882 | S | 10/2015 | Poon |
| 9,170,611 | B2 * | 10/2015 | Gallagher ............... A45C 11/00 |
| 2003/0034263 | A1 | 2/2003 | D'Hoste |
| 2003/0099503 | A1 | 5/2003 | Moor |
| 2003/0111940 | A1 | 6/2003 | Lai et al. |
| 2004/0114315 | A1 | 6/2004 | Anlauff |
| 2005/0103969 | A1 | 5/2005 | Gaines |
| 2005/0238415 | A1 | 10/2005 | Busam et al. |
| 2008/0037213 | A1 | 2/2008 | Haren |
| 2009/0159763 | A1 | 6/2009 | Kim |
| 2010/0101975 | A1 | 4/2010 | Zhang et al. |
| 2011/0163642 | A1 | 7/2011 | Rohrbach et al. |
| 2011/0203955 | A1 | 8/2011 | Fasula |
| 2011/0221319 | A1 | 9/2011 | Law et al. |
| 2011/0240516 | A1 | 10/2011 | Fan |
| 2011/0266194 | A1 | 11/2011 | Bau |
| 2011/0290687 | A1 | 12/2011 | Han |
| 2011/0297564 | A1 | 12/2011 | Kim et al. |
| 2011/0297566 | A1 | 12/2011 | Gallagher et al. |
| 2012/0044638 | A1 | 2/2012 | Mongan et al. |
| 2012/0097831 | A1 | 4/2012 | Olukotun et al. |
| 2012/0211377 | A1 | 8/2012 | Sajid |
| 2012/0211613 | A1 | 8/2012 | Yang |

(56) References Cited

U.S. PATENT DOCUMENTS

| | | | |
|---|---|---|---|
| 2012/0261304 A1 | 10/2012 | Busri | |
| 2012/0293953 A1 | 11/2012 | Wu et al. | |
| 2012/0305413 A1 | 12/2012 | Chung | |
| 2012/0308981 A1 | 12/2012 | Libin et al. | |
| 2012/0325689 A1 | 12/2012 | Wibby et al. | |
| 2013/0015088 A1 | 1/2013 | Wu | |
| 2013/0016467 A1 | 1/2013 | Ku | |
| 2013/0020215 A1 | 1/2013 | Hsu | |
| 2013/0020216 A1 | 1/2013 | Chiou | |
| 2013/0048514 A1* | 2/2013 | Corcoran | A45C 11/00 206/472 |
| 2013/0098782 A1 | 4/2013 | Diebel et al. | |
| 2013/0140203 A1 | 6/2013 | Chiang | |
| 2013/0213838 A1 | 8/2013 | Tsai et al. | |
| 2013/0214661 A1 | 8/2013 | McBroom | |
| 2013/0241381 A1 | 9/2013 | Hynecek et al. | |
| 2013/0264459 A1 | 10/2013 | McCosh et al. | |
| 2013/0313142 A1 | 11/2013 | Wen | |
| 2014/0224676 A1 | 8/2014 | Ashley et al. | |
| 2014/0347814 A1 | 11/2014 | Zaloom | |
| 2015/0052854 A1 | 2/2015 | Diebel et al. | |
| 2015/0108012 A1 | 4/2015 | Poon et al. | |

FOREIGN PATENT DOCUMENTS

| | | |
|---|---|---|
| GB | 1313254 | 4/1973 |
| GB | 2500947 | 10/2013 |
| TW | M418323 | 12/2011 |
| WO | WO 02/13659 | 2/2002 |
| WO | WO 2010/036090 | 4/2010 |
| WO | WO 2011/007267 | 1/2011 |

OTHER PUBLICATIONS

"Targus THZ045US Versavu 360 Degrees Rotating Stand Case for Apple iPad 2/3/4 (Black/Blue Interior)" Amazon.com, 2012, 7 pages.
"Portafolio Fit™ Universal Folio Case for 7-8" Tablets," retrieved from http://www.kensington.com/us/us/v/4465/1749/portafolio-fit-universal-folio-case-for-7-8%22-tablets#.VTVF201FCP6, on or before Oct. 28, 2014, 4 pages.
"FitFolio Cases for iPad 4, 3, and 2," Speck Products, 2014, 1 page.
"Tabcase—Universal Protective Case and Stand for Tablets Up to 8, 9 or 10.1 Inches," retrieved from http://www.blusens.com/en/productos/portabilidad/tabcase/, on or before Oct. 28, 2014, 1 page.
"Solo Classic Universal Fit Tablet/eReader Booklet," retrieved from http://www.walmart.com/ip/22211568?wmlspartner=wlpa&selectedSellerID-24&adid=22222222227016073802&wlO=&wl1=g&wl2=c&wl3=40880248712&wl4=&wl5=pla&wl6=78810781592&veh=sem, on or before Oct 28, 2014, 2 pages.
"ProCase Universal Folio Case for 9-10 inch Tablet, Leather Stand Protective Case Cover for 9" 10.1" Touchscreen Tablet with Multi-angle Stand," retrieved from https://www.amazon.com/ProCase-Universal-Folio-Case-Touchscreen/dp/B00YT0GSAS/ref=pd_sim_sbs_147_25?ie=UTF8&dpID=51Lp4HD4D6L&dpSrc=sims&preST=_AC_UL160_SR160%2C160_&refRID=06H8F5W4PYCR10BE2HAM on or Apr. 21, 2016, 3 pages.
International Search Report and Written Opinion for International (PCT) Patent Application No. PCT/US2012/070974 mailed Apr. 15, 2013, 12 pages.
International Preliminary Report on Patentability for International (PCT) Patent Application No. PCT/US2012/070974, dated Jul. 3, 2014 9 pages.
Official Action for U.S. Appl. No. 13/722,167 mailed Mar. 14, 2014, 9 pages.
Official Action for U.S. Appl. No. 13/722,167 mailed Apr, 28, 2014, 9 pages.
Notice of Allowance for U.S. Appl. No. 13/722,167, mailed Sep. 26, 2014 10 pages.
Official Action for U.S. Appl. No. 14/585,639, mailed Sep. 25, 2015 10 pages.
Notice of Allowance for U.S. Appl. No. 14/585,639, mailed Mar. 14, 2016 5 pages.
Official Action for U.S. Appl. No. 29/440,310, mailed Nov. 21, 2014 6 pages Restriction Requirement.
Official Action for U.S. Appl. No. 29/440,310, mailed Mar. 17, 2015 9 pages.
Notice of Allowance for U.S. Appl. No. 29/440,310, mailed Jun. 9, 2015 7 pages.
Official Action for U.S. Appl. No. 14/104,286, mailed Nov. 14, 2014 12 pages.
Notice of Allowance for U.S. Patent Application No. 29/104,286, mailed Mar. 25, 2015 8 pages.
Official Action for U.S. Appl. No. 29/478,664, mailed Oct. 17, 2014 14 pages.
Notice of Allowance for U.S. Appl. No. 29/478,664, mailed Feb. 4, 2015 6 pages.
Official Action for U.S. Appl. No. 29/478,649, mailed Oct. 16, 2014 12 pages.
Notice of Allowance for U.S. Appl. No. 29/478,649, mailed Feb. 10, 2015 9 pages.

* cited by examiner

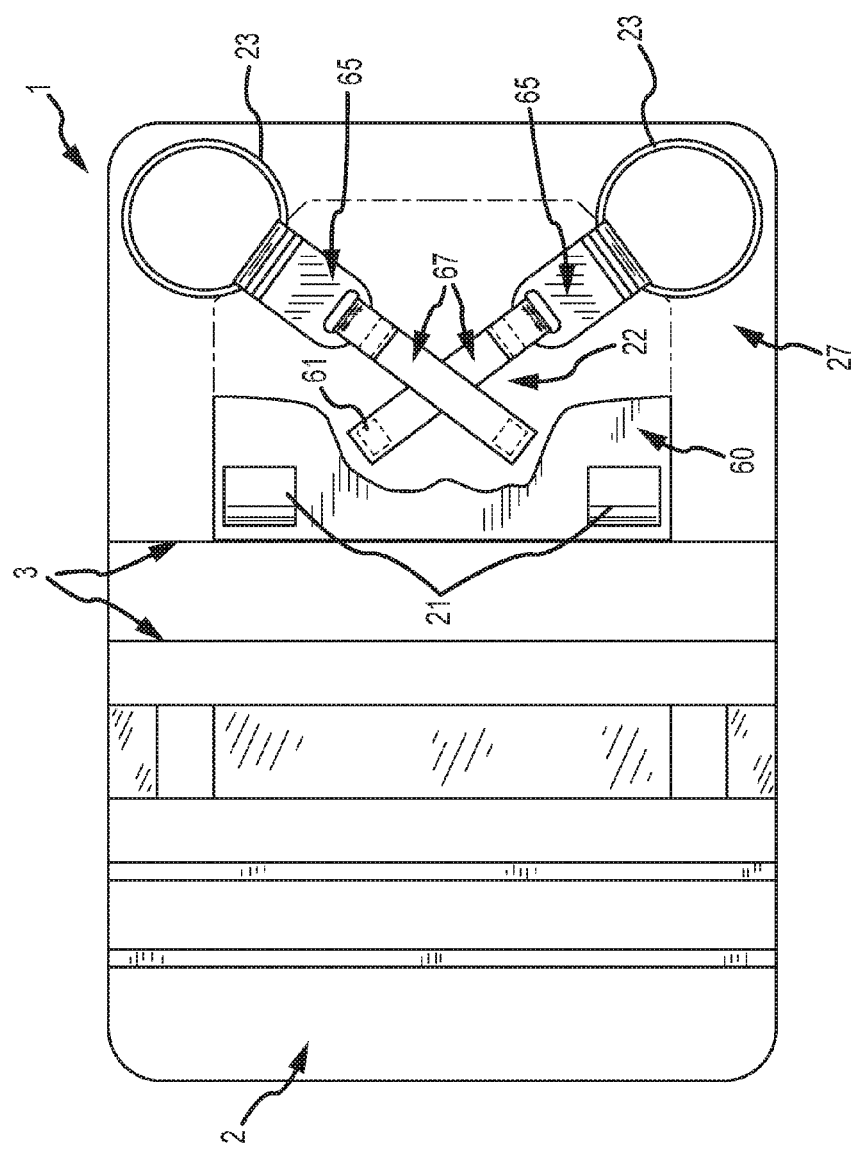

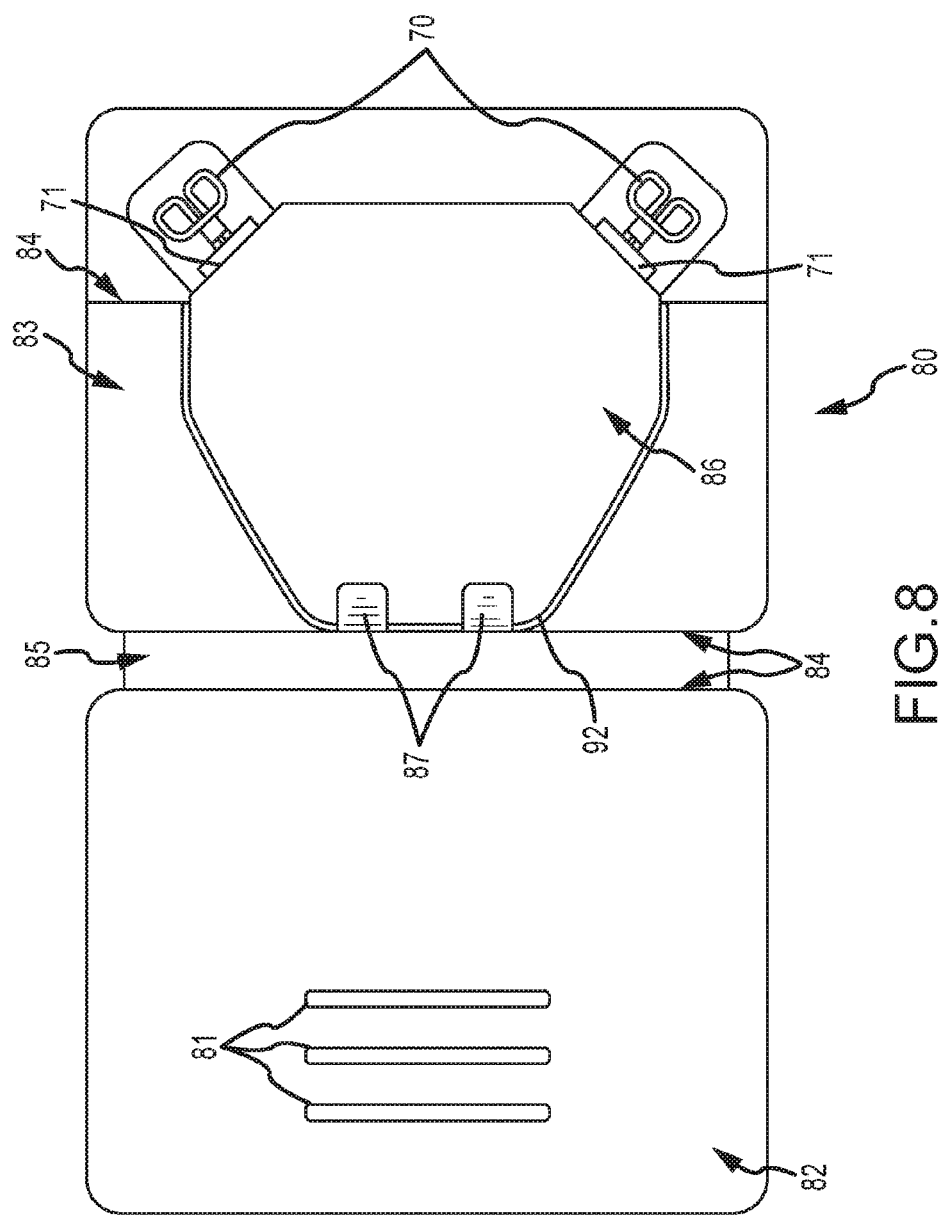

PROTECTIVE CASE FOR AN ELECTRONIC DEVICE

This application is a Continuation of and claims the benefit of priority from U.S. Non-Provisional patent application Ser. No. 14/585,639, filed Dec. 30, 2014, which is a Continuation of U.S. Non-Provisional patent application Ser. No. 13/722,167, filed Dec. 20, 2012 and now issued as U.S. Pat. No. 8,925,722, and U.S. Provisional Application Ser. No. 61/579,264, filed Dec. 22, 2011, the entire disclosures of which are incorporated by reference herein and the benefit of priority of which are claimed herewith.

FIELD OF THE INVENTION

The present invention relates generally to protective cases and covers for electronic devices. More specifically, the present invention relates to a folding case for accommodating a variety of electronic devices, such as tablet computers, e-readers, and other similar devices.

BACKGROUND

Portable electronic devices such as tablets PCs and e-readers have become increasingly popular. An inherent convenience of these devices is that they are highly portable. With increased portability and enhanced electronics, however, comes the need to protect the device from the surrounding environment, impact, and abrasion. Accordingly, as the popularity of the devices continues to increase, so does the need and desire to protect or surround the device with a cost effective storage case. Such cases, covers, sleeves, etc. are limited in the sense that they are designed to fit only a single electronic device. As the number, type, size, and style of portable electronic devices increases, so does the need for a protective case adapted to accommodate a variety of devices of different sizes and shapes.

Finally, there is a need not only for protecting and transporting electronic devices, but also to use the case for the dual purpose of retaining the electronic device in a preferred orientation for viewing purposes.

SUMMARY OF THE INVENTION

Accordingly, the present invention contemplates a novel system and device for a protective case for an electronic device wherein the case is provided with features for selectively accommodating and retaining a variety of electronic devices of various shapes and/or sizes, as well as allowing the selective positioning of the device for viewing.

The Summary of the Invention is neither intended nor should it be construed as being representative of the full extent and scope of the present disclosure. The present disclosure is set forth in various levels of detail in the Summary of the Invention as well as in the attached drawings and the Detailed Description of the Invention and no limitation as to the scope of the present disclosure is intended by either the inclusion or non-inclusion of elements, components, etc. in this Summary of the Invention. Additional aspects of the present disclosure will become more readily apparent from the Detailed Description, particularly when taken together with the drawings.

One aspect of the present invention is to provide a protective case with at least one hinge or fold for enveloping a portable electronic device and retaining means for the portable electronic device. Retaining means include, for example, one or more elastic members for securing at least one portable electronic device. Retaining means also include one or more biasing members for securing an electronic device.

Another aspect of the present invention is to comprise one or more substantially rigid guide or support members. Guide or support members may comprise one or more rigid hooks or a shelf for supporting a device along at least one edge or dimension. In combination with support member(s), it is contemplated that elastic securing means are further provided in order to bias an electronic device toward or into the support member(s). Further, elastic securing means comprise at least one biasing member secured to the case at one end and securable to an electronic device at a second end. Securing means may be disposed substantially opposite from contemplated support members so as to bias an electronic device toward or into support members.

In another aspect, the present invention comprises a protective case for a variety of portable electronic devices such that a single case is suitable for use with a plurality of different sized electronic devices.

In a further aspect, the present invention comprises a plurality of hinges or folds, such that the case may be converted between two or more of: 1—a "closed book" configuration; 2—an "open book" configuration; 3—a "folded open" configuration; and 4—a "propped open" or self-supported configuration. A case of the present invention may comprise at least two hinge features and at least one channel, slot, indention, indentation, or trough, such that the case may be positioned in an open position and with a contained device residing at a predetermined angle, such as may be desirable for using the device.

In an additional aspect, the present invention comprises a protective case for retaining, displaying, and storing a plurality of differently sized electronic devices, comprising a first cover portion hingedly interconnected to a second cover portion by a hinge, the second cover portion comprising a substantially rigid planar member, the substantially rigid support member interconnected to the second cover portion for supporting the electronic device and resisting movement of the electronic device in one direction, and an elastic member in force-transmitting communication with the second cover portion, the elastic member comprising a biasing force and a component of the biasing force is directed toward at least one substantially rigid support member.

An alternate aspect of the present invention is to comprise a protective case for retaining, displaying, and storing a plurality of differently sized electronic devices. The protective case comprises a first cover portion hingedly interconnected to a second cover portion, the second cover portion comprising a substantially rigid planar member, a substantially rigid support member interconnected to the second cover portion for supporting the electronic device and resisting movement of the electronic device with respect to the protective case in at least one direction, an elastic member in force-transmitting communication with the second cover portion, the at least one elastic member comprising a biasing force and at least one component of the biasing force being directed toward the substantially rigid support member, the second cover portion comprising a hinge member, such that a portion of the second cover portion is rotatable with respect to the first cover portion about two parallel axes of rotation, and the first cover portion comprising a plurality of indentations for selectively receiving a lateral edge of the second cover portion at an obtuse angle relative to the first cover portion.

In one aspect, the present invention comprises a protective case for retaining, displaying, and storing differently sized electronic devices, comprising a first cover portion, a second cover portion hingedly interconnected to the first cover portion by a first hinge, the second cover portion comprising a substantially rigid planar member and a second hinge, such that a portion of the second cover portion is rotatable with respect to the first cover portion about at least two parallel axes of rotation, a first support member interconnected to the second cover portion for supporting an electronic device and resisting movement of the electronic device with respect to the protective case in at least one direction; and a second support member interconnected to the second cover portion for supporting the electronic device and resisting movement of the electronic device with respect to the protective case in a second direction, and the second direction is different from the at least one direction.

In another aspect, the present invention comprises a method for securing a device within a case, the method comprising providing the case with a first cover portion hingedly interconnected to a second cover portion by at least one hinge, the second cover portion comprising a substantially rigid planar member, a substantially rigid support member interconnected to the second cover portion for supporting the device and resisting movement of the device in a direction, and an elastic member in force-transmitting communication with the second cover portion, the elastic member comprising a biasing force and a component of the biasing force is directed toward the substantially rigid support member; inserting a first edge of the device within the substantially rigid support member; inserting an opposing second edge of the device within the case by outwardly deforming the elastic member, placing a back surface of the device substantially flush with the second cover portion, and allowing the elastic member to engage and secure a corner of the device under the elastic member's own elasticity or restoring force.

Another aspect of the present invention is to provide at least one slot or channel on the inside surface of the cover for engaging and retaining the substantially rigid planar member in a predetermined orientation. The predetermined orientation may position the electronic device such that it is tipped up or tilted in a reading position or other position of use.

In various aspects, protective cases of the present invention comprise various protective features including, but not limited to, rigid or hard-shell outer covers, cushioned materials, soft or non-abrasive interior portions to reduce risk of abrasion, etc.

These and other advantages will be apparent from the disclosure of the invention(s) contained herein. The above-described aspects, embodiments, objectives, and configurations are neither complete nor exhaustive. As will be appreciated, other aspects and embodiments of the invention are possible using, alone or in combination, one or more of the features set forth above or described in detail below. Further, the summary of the invention is neither intended nor should it be construed as being representative of the full extent and scope of the present invention. The present invention is set forth in various levels of detail in the summary of the invention, as well as, in the attached drawings and the detailed description of the invention and no limitation as to the scope of the present invention is intended to either the inclusion or non-inclusion of elements, components, etc. in this summary of the invention. Additional aspects of the present invention will become more readily apparent from the detailed description, particularly when taken together with the drawings.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure invention and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosures.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

Figure 1:
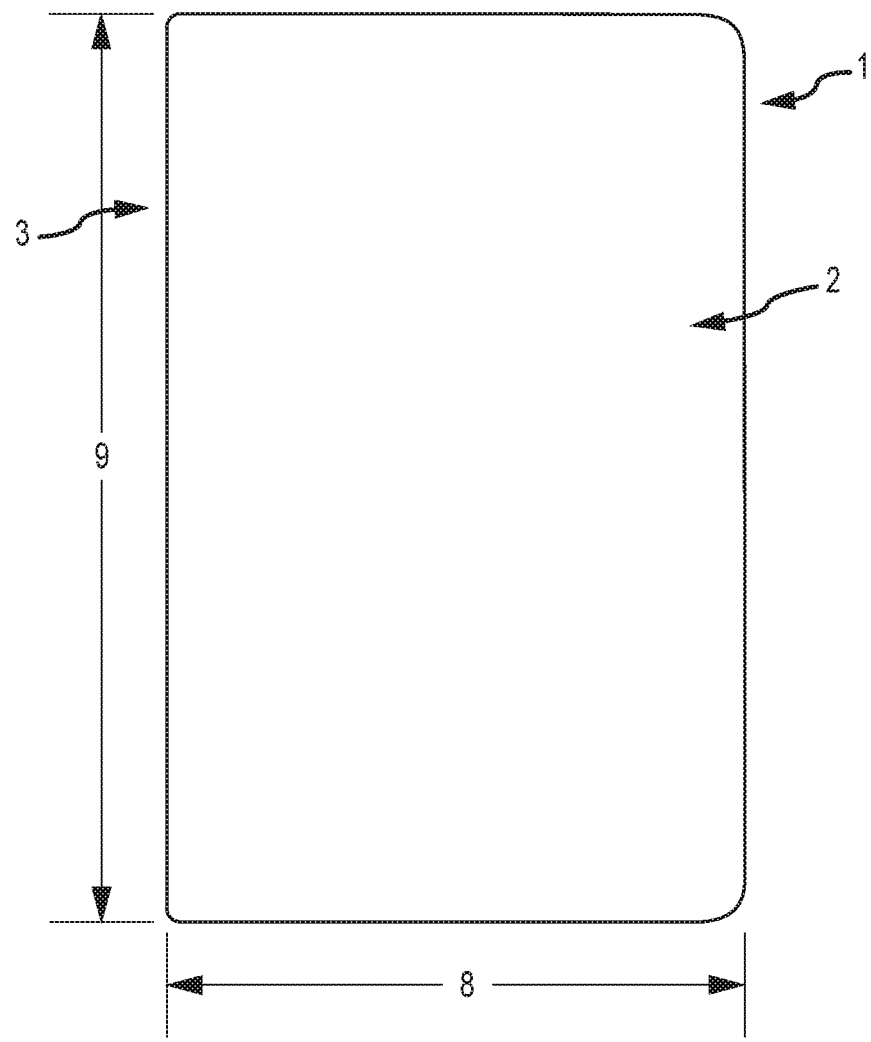
Figure 2:
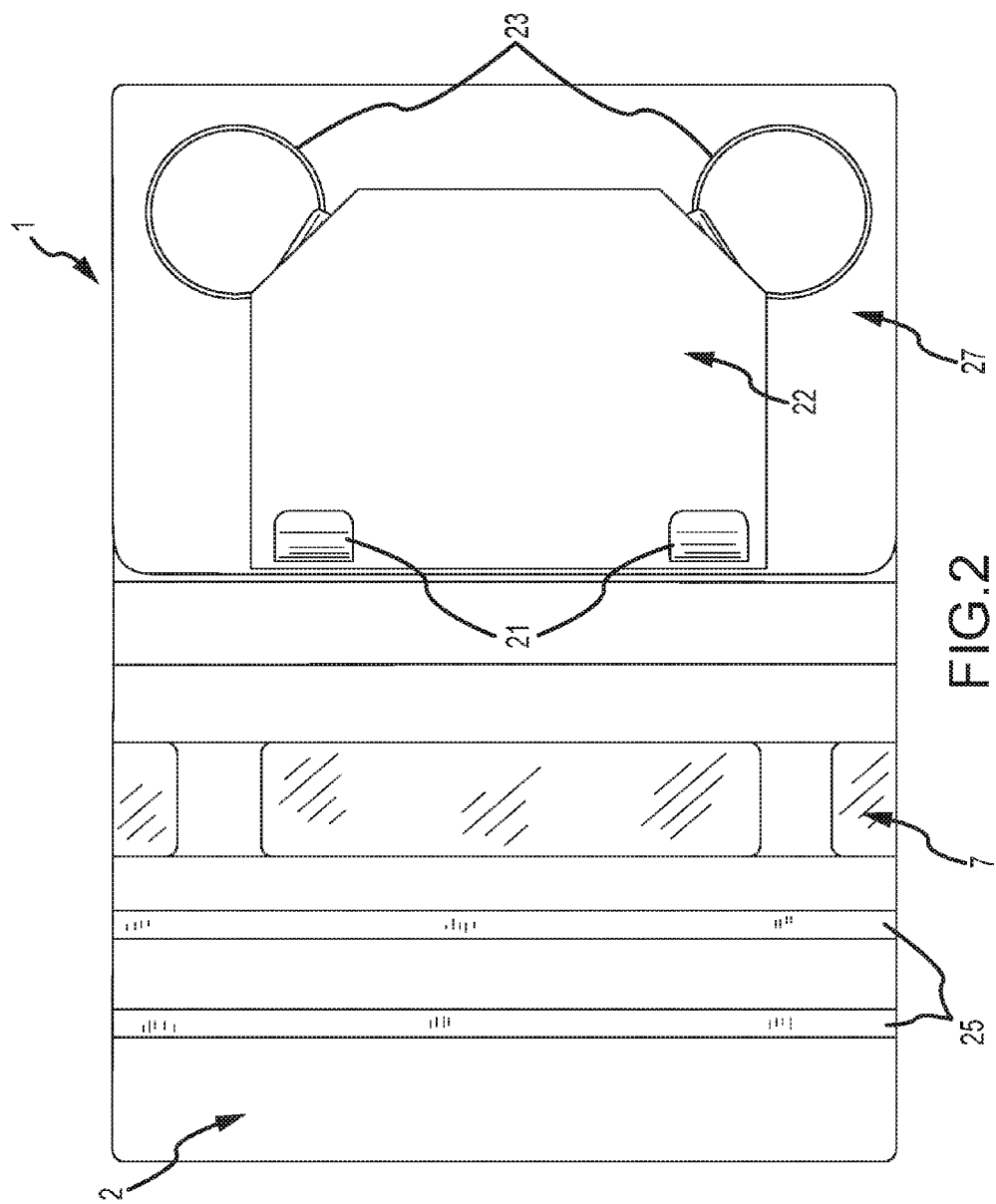
Figure 3:
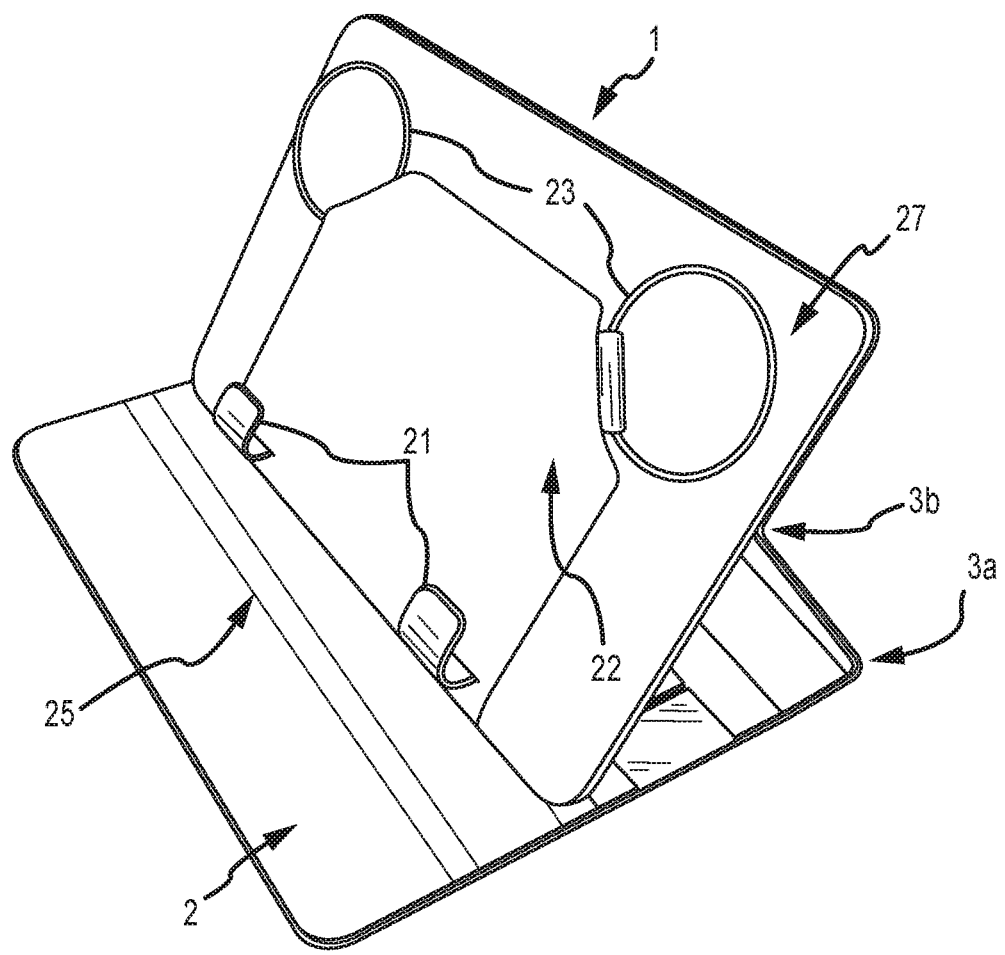
Figure 4:
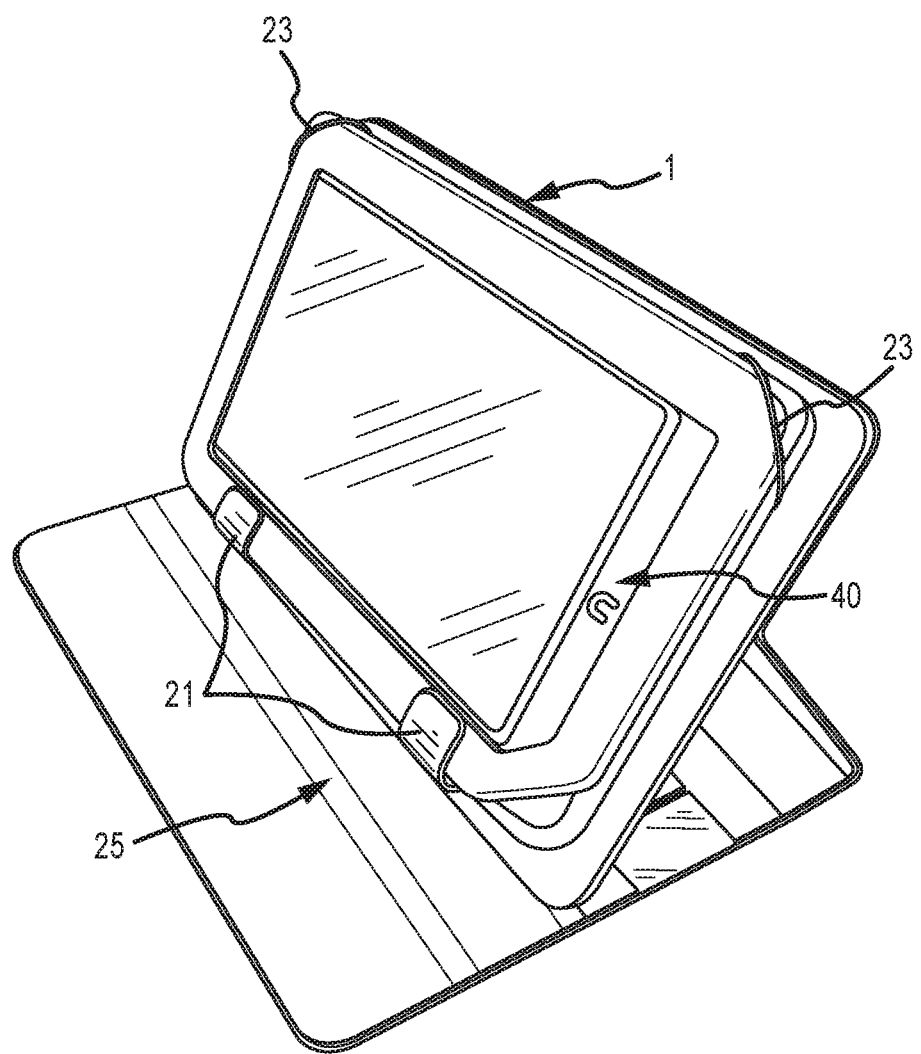
Figure 5A:
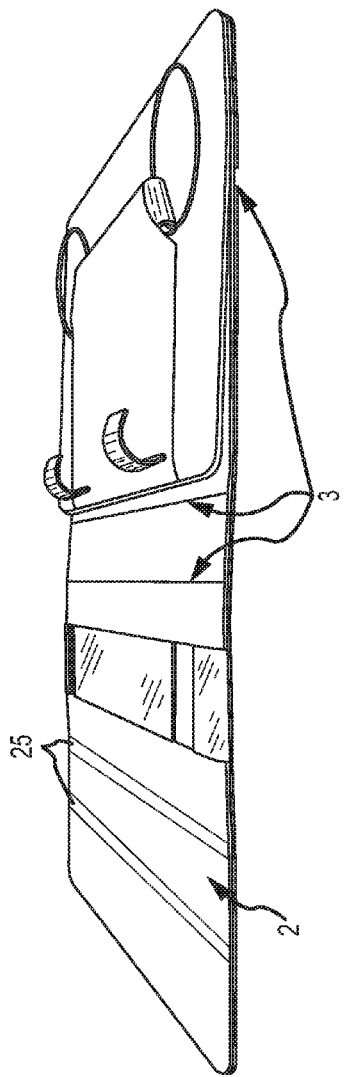
Figure 5B:
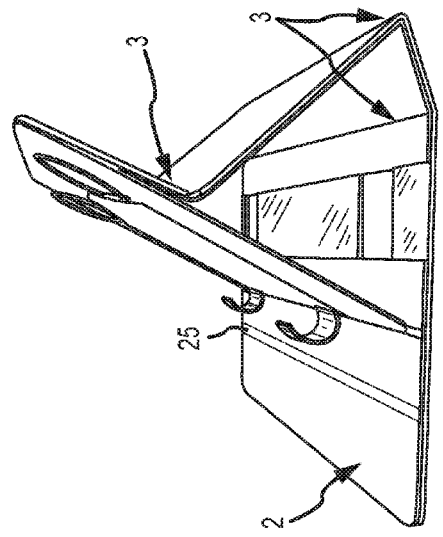
Figure 7A:
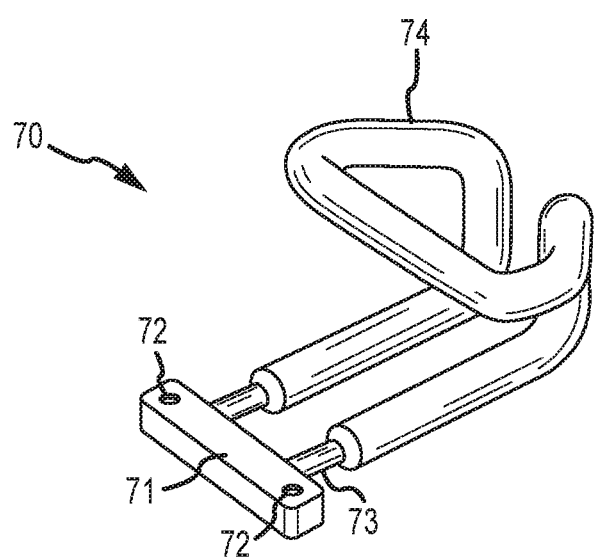
Figure 7B:
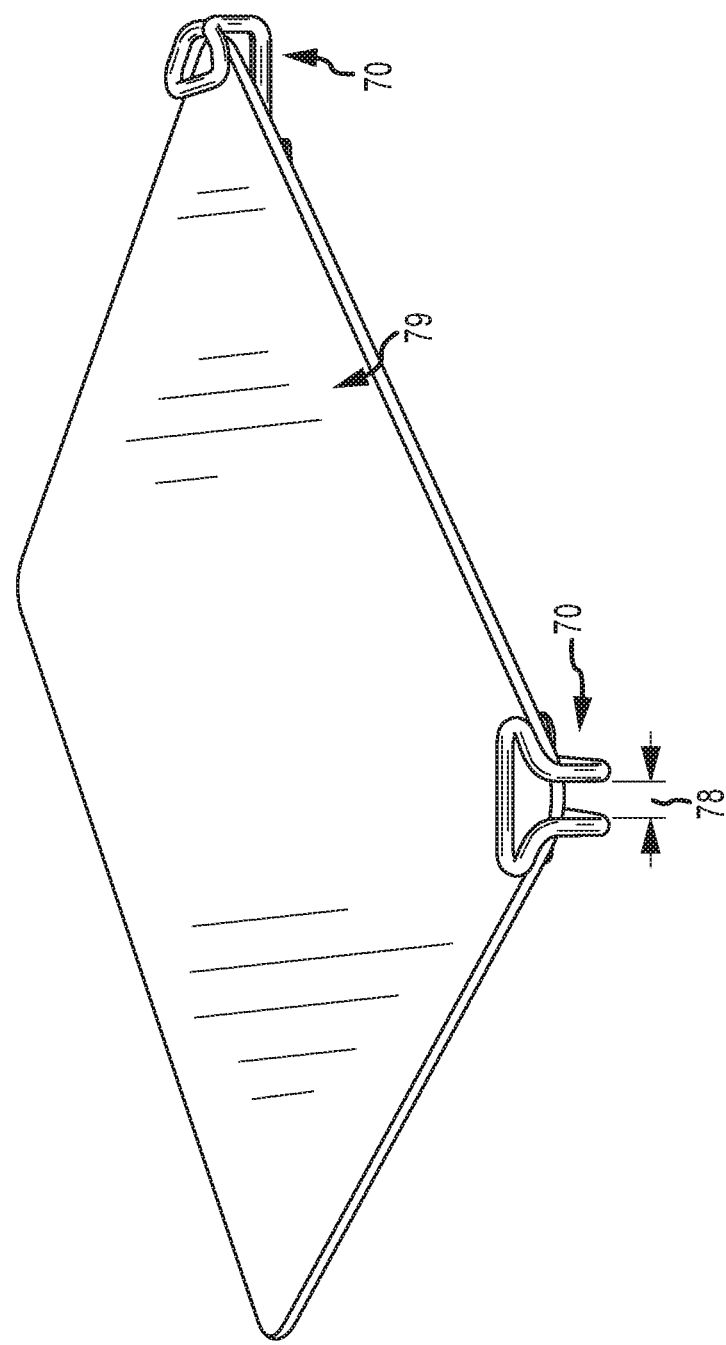
Figure 9:
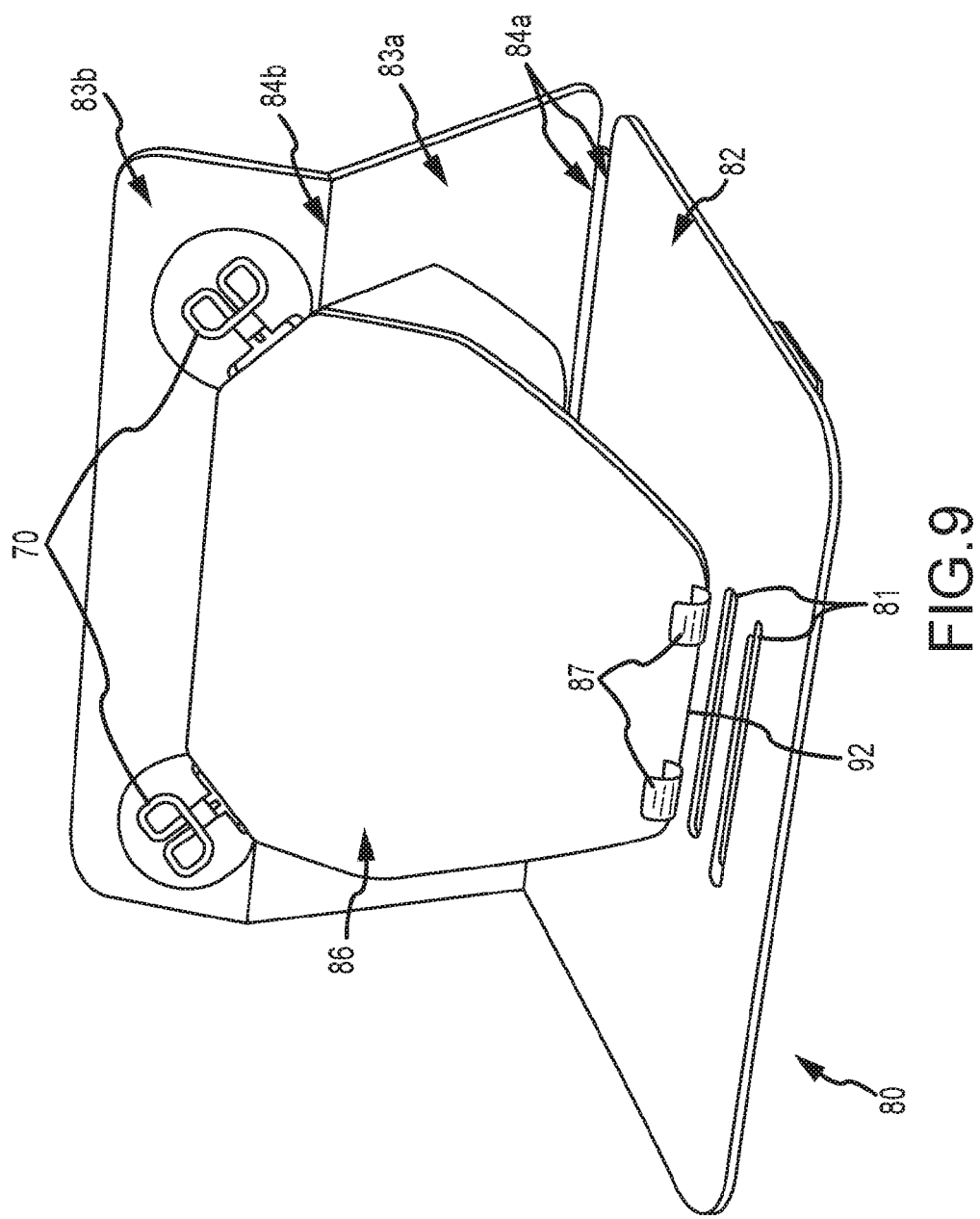
Figure 10:
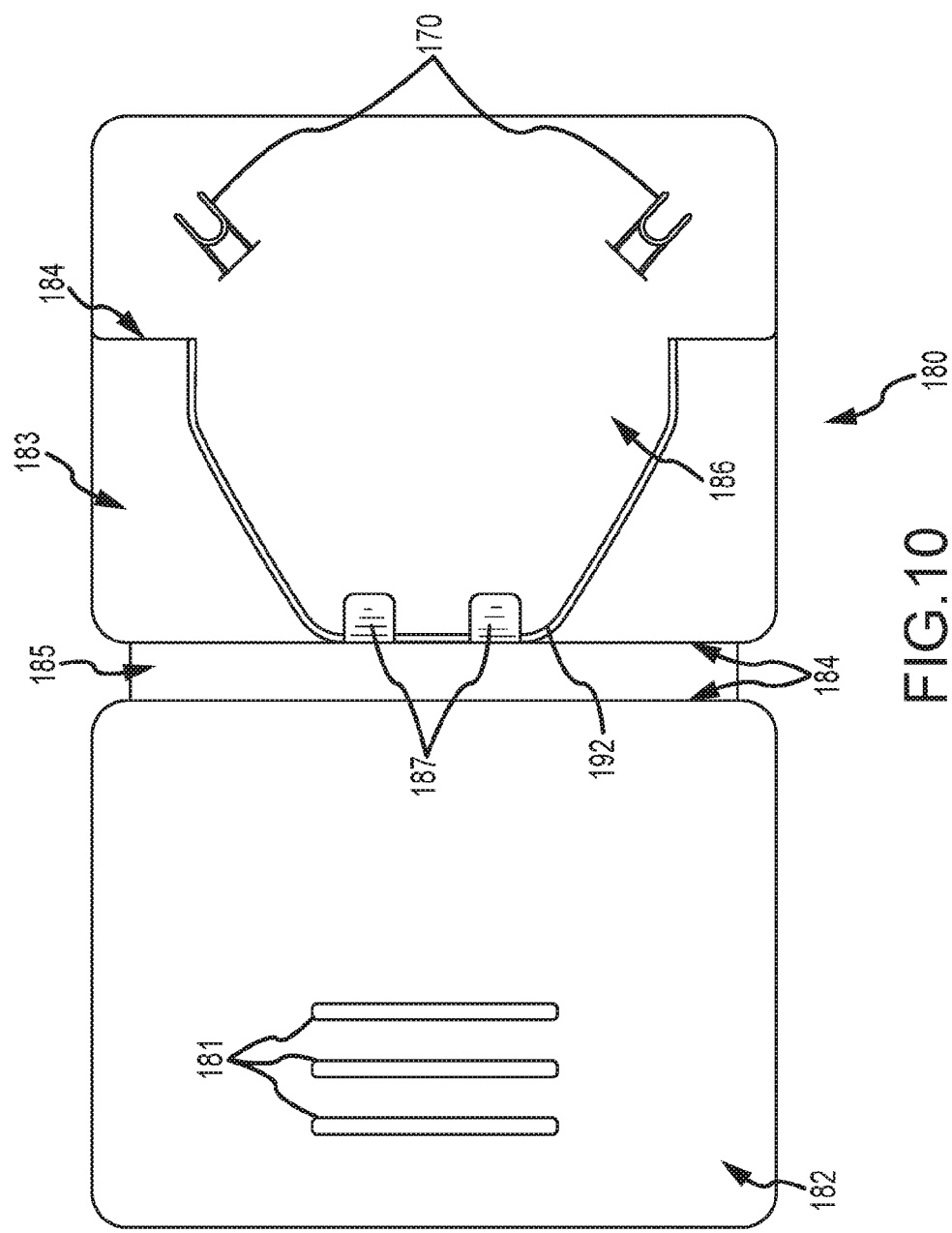
Figure 11:
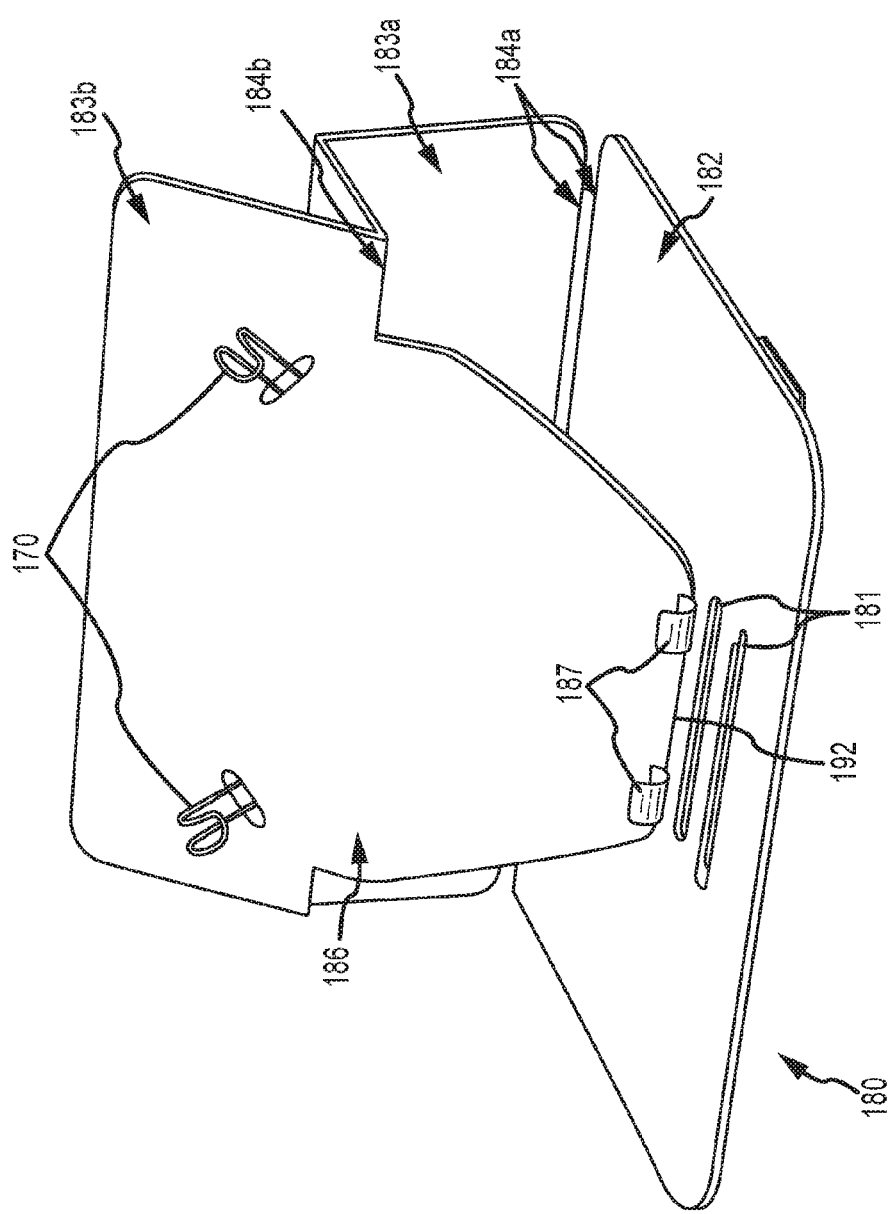

FIG. 1 is front view of a protective case of one embodiment of the present invention;

FIG. 2 is a front view of a protective case of one embodiment of the present invention in an open position;

FIG. 3 is a front perspective view of a protective case of one embodiment of the present invention in a propped open position;

FIG. 4 is a front perspective view of a protective case of one embodiment of the present invention and a portable electronic device;

FIGS. 5A-5B depict an opening sequence of one embodiment of the present invention;

FIG. 6 is a front elevation view of a protective case of one embodiment of the present invention provided in an open position;

FIG. 7A is a perspective view of a support member of one embodiment of the present invention;

FIG. 7B is a perspective view of a device secured within support members of one embodiment of the present invention;

FIG. 8 is a front elevation view of a protective case of a second embodiment of the present invention provided in an open position;

FIG. 9 is a front perspective view of a protective case of a second embodiment of the present invention in a propped open position;

FIG. 10 is a front elevation view of a protective case of a third embodiment of the present invention provided in an open position; and FIG. 11 is a front perspective view of a protective case of a third embodiment of the present invention in a propped open position.

DETAILED DESCRIPTION

The present invention has significant benefits across a broad spectrum of endeavors. It is the applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment of the method that illustrates the best mode now contemplated for putting the invention into practice is described herein by, and with reference to, the annexed drawings that form a part of the specification. The exemplary method is described in detail without attempting to describe all of the various forms and modifications in which the invention might be embodied. As such, the embodiments described herein are illustrative, and as will become apparent to those skilled in the arts, can be modified in numerous ways within the scope and spirit of the invention.

The detailed description is to be construed as exemplary only and does not describe every possible embodiment since describing every possible embodiment would be impractical, if not impossible. Numerous alternative embodiments could be implemented, using either current technology or technology developed after the filing date of this patent.

To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

The term elastic, as used herein, may refer to rubber, plastic, other elastomers, and any other material having a biasing property.

Referring now to FIGS. 1-4, a protective case 1 for an electronic device according to one embodiment of the present invention is shown. It should be understood that the drawings are not necessarily to scale. In certain instances, details that are not necessary for an understanding of the invention or that render other details difficult to perceive may have been omitted from these drawings. It should be understood, of course, that the invention is not limited to the particular embodiments illustrated in the drawings.

As shown in FIG. 1, a protective case 1 is provided. The protective case 1 comprises a height 9 and a width 8 for accommodating various devices, such as portable electronic devices. The protective case 1 preferably comprises a first cover 2, a rear portion or second cover (not shown in FIG. 1), and a hinge 3, such that the protective case 1 surrounds or covers at least three sides of a portable electronic device comprising a rectangular cube configuration. The protective case 1 of FIG. 1 is shown in a closed configuration. The first cover 2 may also be referred to herein as a cover or a first cover portion.

FIG. 2 provides a front view of the case 1 of FIG. 1 shown in an open configuration. In an embodiment, the case 1 has a second cover 27. The second cover 27 may be referred to as a back cover, a rear portion, a second cover portion, and a cover. Further, the second cover 27 may comprise a substantially rigid planar member. As shown, the protective case 1 comprises support members 21 for receiving one or more electronic devices and elastic securing means 22 for biasing one or more electronic devices against the support members 21. The elastic securing means 22 may also be called biasing securing means. In an embodiment, the elastic securing means 22 are secured to the second cover 27 by stitching, glue, Velcro®, or any other securing means. Corner support members 23 for communicating with corners of an electronic device may be provided at the second end(s) of the elastic securing means 22. In various embodiments, the corner support members 23 may be loops 23. While the corner support members 23 of FIG. 2 are depicted as loops 23, various embodiments of the present invention contemplate alternative corner support members 23.

While the support members 21 of FIG. 2 are depicted as a pair of substantially rigid hooks, various embodiments of the present invention contemplate alternative support members 21. In some embodiments, the support members 21 may be substantially rigid support members. That is, the present invention is not limited to a device comprising one or more hooks as support members 21. Indeed, it is contemplated that various features and materials such as hook and eye loop material (i.e., Velcro®), magnets, protrusions, troughs, corner brackets or a rigid shelf, and combinations thereof may be provided as support members 21. It will be recognized that support members 21 are provided primarily to oppose a force applied by elastic securing means 22 on an electronic device and thereby maintain the electronic device in a predetermined position. The predetermined position may be an elevation or propped-up position for reading or viewing the electronic device. The predetermined position may also be a confined position when the case is closed or laying flat. Elastic securing means 22, as used herein, is not limited to any particular material or device. Rather, elastic securing means 22 are contemplated as including, for example, any number of materials and devices comprising biasing or elastic properties, such as rubber, springs, spandex, and various combinations thereof.

A variety of support may be provided to accomplish this objective of the present invention. In an alternative embodiment, a single support is provided. Additionally, while FIG. 2 depicts support members 21, elastic securing means 22, and loops 23 being disposed opposite a width-wise direction of the case 1, the present invention is not so limited. Indeed, various embodiments contemplate providing features such as support members 21 and opposing loops 23 and corresponding elastic securing means 22 opposite a height-wise direction or disposed diagonally.

In various embodiments, wire loops 23 are provided. Wire loops 23 may further be provided with a non-abrasive and/or non-slip material as a coating. Wire loops 23 of the present invention provide various benefits including, for example, the ability to conform or adapt to various different corner geometries of electronic devices, while still providing means for transmitting a force a tension to the device in order to maintain the device in a substantially static arrangement. In various embodiments, the loops 23 may be corner support members. Further, in embodiments, the loops 23 may be resilient loops.

As shown in FIG. 2, elastic securing means 22 are provided comprising two straps secured at their first ends to a portion of the protective case 1 and comprising loops 23 at their second ends. In some embodiments, the straps may be elastic straps or any stretchy or slightly stretchy straps. In alternative embodiments, however, elastic securing means 22 comprise springs and various other linear and non-linear biased features. Loops 23 are provided to be selectively placed around corners of an electronic device and convey a biasing force or tension from the elastic securing means 22 to the electronic device for securing or biasing an electronic device against one or more support members 21. Various adjustable features, such as adjustable hooks and loops 23 may be provided to adjust a functional length of the elastic securing means 22. As shown in FIG. 2, loops 23 of the present invention may comprise substantially non-rigid members capable of withstanding a tensile force. For example, loops 23 may be wire or coated-wire structures capable of generally surrounding a corner of a cube-like electronic device and further capable of transferring a force applied by elastic securing means 22. In alternative embodiments, plastic hooks of various configurations, elastic loops, plastic loops, stretchy loops, etc. are provided in lieu of or in addition to substantially non-rigid loops 23.

The embodiment of FIG. 2 has material, which may be a cover for the elastic securing means 22, over the elastic securing means 22 such that the material is not numbered and the elastic securing means 22 are disposed behind the material. Features such as elastic securing means 22 may be disposed or provided underneath an elastic securing means cover secured to an internal portion of the case 1 such that securing means 22, for example, are separated from an electronic device to be protected. This is further demonstrated in FIG. 6.

FIG. 2 further shows an embodiment with a strap 7 provided on the inside of the first cover 2. In some embodiments, the strap 7 is elastic or stretchy such that the strap 7 may be pulled away from the front cover 2 and an electronic device may be positioned under the strap 7. The strap 7 may be composed of a material that is an elastomer, leather, plastic, or any other material used in the case 1. The electronic device may be stored under the strap 7 in times of use or when carrying the case 1 in a closed position. In additional and alternate embodiments, the strap 7 may be used to hold or secure other items in place in the case, such as paper, pens, cards, etc. Further, the strap 7 may be used to hold onto the case 1 when the case 1 is in an open position. In various embodiments the strap 7 may be composed of one or more materials.

FIG. 3 depicts a protective case 1 according to one embodiment disposed in a self-supported position, wherein at least two hinge features 3a, 3b are provided for converting the case 1 from a closed position to a "display" or self-supported position. One or more channels 25 are further provided for selectively retaining at least a portion of the case 1 at one or more predetermined angles. The word channel may refer to and may be used interchangeably herein with slot, indentation, indention, trough, and elongated recesses. In an embodiment, the one or more channels 25 are provided in a first cover 2. In an embodiment, the channel(s) 25 may allow an electronic device to be displayed by a user at an obtuse angle relative to the first cover 2 or relative to a horizontal plane. In alternate and additional embodiments, hook and loop material (i.e., Velcro®) may be used for retention purposes and to keep the device positioned at an obtuse angle relative to the first cover 2. Further, a raised rail may be used to retain the electronic device at an obtuse angle and/or in an up-right position, tipped up position, reading position, or other position of use. This can further be seen in FIG. 4.

In an embodiment, at least one of a spine and the first cover 2 may comprise a first hinge 3a. Additionally, the second cover 27 may comprise a second hinge 3b such that a substantially rigid planar member rotates at the second hinge 3b about an axis parallel to the axis of rotation of the first hinge 3a. The second cover 27 and/or the movable piece (not numbered but shown below the second hinge 3b) may be a substantially rigid planar member.

FIG. 4 depicts a protective case 1 for an electronic device with an exemplary electronic device 40 disposed therein. As shown, a tablet or nook® is provided and securely disposed within the case 1. Support members 21 provide means for defining a secure position of the device 40 and elastic securing means and loops 23 are provided to securely hold or bias the device 40 against the support members 21. As the elastic securing means are expandable, cases 1 of the present invention are capable of accommodating a wide variety of devices 40, such as a Kindle®. While the embodiment illustrated is well suited for housing a plurality of e-readers, smaller and larger versions of the protective case 1 are contemplated that are adapted for housing or protecting tablets, such as an iPad®, a Galaxy®, a PlayBook®, an Android® tablet, an Iconia and various similar devices 40 whether or not currently conceived of.

FIGS. 5A-5B depict one embodiment of the present invention comprising a plurality of hinges 3 to enable the case to be disposed in a self-supported position. As shown in FIG. 5A, the case is displayed in a substantially flat open position, with the cover 2 on the left. Two centrally located hinges 3 are provided at or near the spine of the cover 2. A third hinge 3 is provided at a mid-portion of the rear portion of the case. The rear portion of the case, in one embodiment, therefore, comprises a layered arrangement wherein the electronic-device-securing portion is capable of pivoting with respect to additional features. FIG. 5B depicts the case disposed in a self-supported position wherein the cover 2 provides a secure base and the electronic device displayed at an angle, such as may be suitable for reading and/or typing.

In a preferred embodiment, a protective case of the present invention comprises a plurality of elongated ridges, channels, indentions, indentations, or slots, each of the elongated ridges or slots 25 corresponding to a predetermined angle at which a contained-device may be situated. While various embodiments contemplate that the case and device may be maintained at a desired position based on the weight and geometry of the case, slots, and/or device, it is further contemplated that additional securing features may be provided. Additional securing features include, but are not limited to Velcro®, magnets, snaps, rubber grips, and various similar features as will be recognized by one of skill in the art.

FIG. 6 is a front view of a protective case 1 in an open position. Portions of the case 1 have been removed in FIG. 6 to reveal elastic securing means 22 according to one embodiment. In an embodiment, the elastic securing means 22 may comprise straps 67, connection members 65, loops 23, and stitching 61. Specifically, an elastic securing means cover 60 according to one embodiment has been shown as partially removed to reveal various underlying components. The elastic securing means cover 60 is provided in various embodiments to help guide elastic securing means 22, protect elastic securing means 22 from abrasion, and reduce wear on the elastic securing means 22. Loops 23 may be sized to provide an interference fit with apertures in the securing means cover 60 and prevent the loops 23 from retracting underneath the cover 60. As shown, elastic securing means 22 are stitched 61 or otherwise secured to an inner portion of a second cover 27 (which, in some embodiments, may be a back or rear cover) of the protective case 1 at a first end of the strap 67 of the elastic securing means 22 and provided with a loop 23 at a second end. Loops 23, as shown and described herein, generally comprise one or more flexible members capable of transmitting a tension force. In a preferred embodiment, connection members 65 are provided to connect one or more loops 23 to straps 67 of the elastic securing means 22. Connection members 65 include, in various embodiments, lightweight rigid members for transmitting a force between the straps 67 of the elastic securing means 22 and a loop 23. In an embodiment, the straps 67 may be elastic or rigid and secured to the second cover 27 by stitching 61 or glue. The straps 67 may be provided to connect the connection members 65 or loops 23 (if there are no connection members 65) to the second cover 27. The straps 67 may be capable of transmitting a tension force to secure the electronic device.

FIG. 6 depicts one embodiment of an elastic securing means 22 and corresponding loops 23 for engaging a corner or other portion of an electronic device. As shown, in this embodiment, the elastic straps 67 are provided in a crossover arrangement. However, it should be expressly recognized that elastic securing means 22 and loops 23 of the present invention may be provided in any number or arrangements. Additionally, the present invention is not limited to two elastic securing means 22 and two corresponding loops 23 as shown in FIG. 6. Indeed, any number of geometrical arrangements may be provided in accordance with the present invention. For example, the loops 23 may be comprised of rubber, metal, plastic, fiberglass or other materials which can be positioned around a portion of an electrical device and preferably around a corner portion. Additionally, the loops 23 may be any number of corner connection members other than loops. The connection members may be comprised of a substantially rigid material, such as a rubber or plastic component, and the elastic securing means 22 comprised of various spandex or elastane fibers, for example. Alternatively, embodiments of the case may comprise straps 67 connected directly to a loop 23, and thus devoid of the connection member(s) provided in other embodiments. In some embodiments, the elastic securing means 22 are comprised of one continuous component from the attachment to the second cover 27 to the corner support members 23, meaning that there is only one component of the elastic securing means 22 and not multiple components 67, 65, 23 as shown in FIG. 6. Further, in alternate embodiments, the loops 23 may be directly attached to the second cover 27 and not connected by the connection members 65 and straps 67.

Additionally, in yet another embodiment, stretchable loops 23 may be provided. Stretchable loops 23, in one embodiment, comprise bendable or rubber or elastic loops at least partially secured directly to a second cover portion 27 of the case 1. In various embodiments, stretchable loops 23 secured directly to the case obviate the need for additional components, such as elastic securing means 22, straps 67, and connection members 65.

In further still alternative embodiments, an elastic loop 23 is provided wherein the elastic loop 23 is secured to a portion of the case by a substantially rigid member, such as a strap 67 or connection member 65. Accordingly, while various embodiments are described herein, it will be expressly recognized that the present invention is not limited to the particular arrangements as shown and described. Indeed, a variety of combinations and alternatives for securing an electronic device as will be recognized by one of skill in the art is contemplated.

While the embodiment provided in FIG. 6 depicts support members 21 disposed proximal to a hinge 3 of the protective case 1 and loops 23 disposed distal from the hinge 3, the present invention is not limited to such a particular arrangement. Indeed, it is contemplated that support members 21 be disposed distal from the hinge 3 and loops 23 provided and adapted for securing corners of an electronic device disposed proximal to the hinge 3. Alternatively and additionally, loops 23 and elastic securing means 22 may be provided and adapted for contacting upper or lower corners of an electronic device. Furthermore, the present invention is not limited to two elastic securing means 22 and two corresponding loops 23 as shown. The present invention contemplates an electronic device case 1 comprising any number of securing means (i.e., corner support members or loops 23), including as few as one and as many as six, and any number of substantially rigid support members 21, including as few as one and as many as six.

A planar portion of the second cover 27 (back cover part that moves) and the various components attached thereto are described in isolation from a case in which they are preferably stored. In some embodiments, the planar portion may be only a portion of the second cover 27; thus, the second cover 27 may consist of the planar portion and other components and portions. In other embodiments, the second cover 27 may consist essentially of the planar portion. The planar portion may be a substantially rigid planar portion.

In some embodiments, the planar portion of the second cover 27 may comprise one or more of corner support members 23, elastic securing means 22, connection members 65, straps 67, substantially rigid support members 21, stitching 61, and an elastic securing means cover 60. The planar portion receives an electronic device such that the electronic device is secured, interconnected, or temporarily attached to a top surface or inner surface of the planar portion. The device can be received by and interconnected to the planar portion through various different methods. In one embodiment of the receiving method, one side or edge of the device is first supported by and slipped into the one or more support members 23 such that one side of the device (preferably the back side) is substantially parallel to the planar portion. A substantial portion of one side of the device may even touch or lay flat on the planar portion. The device may then be further secured and supported by hooking one loop 23, if there is a loop 23, around one corner of the device. The loop 23 and elastic securing means 22 may need to be pulled such that the straps 67 are stretched in tension and, thus, able to be looped around the corner of the device. If the planar portion consists of two or more loops 23 or elastic securing means 22, then the second loop 23 or elastic securing means 22 should be hooked, looped, or secured around a second corner of the device. Once the device is secured to the planar portion by one or more support members 21, 23, the device should resist substantial motion in any direction. In alternate embodiments, the loops 23 may be replaced with other corner support members or additional support members 21. Further, the planar portion may, in some embodiments, comprise four loops 23 and no support members 21. Additionally and alternatively, the planar portion may comprise two or more support members 21 and no loops 23. Such embodiments of the planar portion may be used with any number of features and components described herein and such embodiments may be used with any of the cases described herein.

FIG. 7A depicts one embodiment of an electronic device corner support member 70. Support member 70 is provided to secure a corner or edge of an electronic device (not shown). The support member 70 comprises a mount or bracket 71 with holes 72 for securing the support member 70 to a case (not shown), and preferably to an interior portion of an electronic device case (not shown). Screws, bolts, rivets, pins, nails, or other fasteners may be positioned within or through the holes 72 to attach the bracket 71 to the case. At least one pliable wire member 73 extends from the bracket 71 to form a hook or loop structure for securing an electronic device. The embodiment depicted in FIG. 7A comprises a flexible or pliable wire member 73 with at least two points of inflection, such that a 180 degree bend in the member 70 is provided, within which a device may be secured. Pliable wire member 73 preferably comprises a scratch-resistant and/or frictional coating 74, such as a polyurethane layer. Such a coating 74 or polyurethane layer reduces a risk of scratching an associated device, as may occur with a wire 73 alone, and increases a frictional hold on a device.

Although FIG. 7A depicts one embodiment of a support member 70 for securing a device, it will be expressly recognized that the present invention is not so limited. Various alternative embodiments of support members 70 are contemplated for use. For example, a single wire 73 is provided in one embodiment of the support member 70, wherein the single wire 73 comprises a "J" shaped hook for receiving and securing an electronic device. In additional and alternative embodiments, a plurality of "J" shaped hooks is provided, but the "J" shaped hooks are not interconnected (as shown in FIG. 7A).

FIG. 7B depicts a device 79 at least partially secured within a pair of support members 70. For illustration purposes, the device 79 and support members 70 are depicted in isolation from a case in which the components are preferably stored. The device 79 may be at least one of an iPad®, a tablet device, an e-reader, a PDA, a laptop, a digital music player, a mobile phone, a portable gaming device, an ultrabook™, and a portable checkout unit. The support members 70 comprise a wire member formed with a minimum gap distance 78 between portions of the curved wire member. In one embodiment, the minimum gap distance 78 ranges between approximately 0.25 cm and 5 cm. In a preferred embodiment, the minimum gap distance 78 ranges between approximately 0.5 cm and 3 cm. In a more preferred embodiment, the minimum gap distance 78 ranges between approximately 0.75 cm and 2 cm. In a most preferred embodiment, the minimum gap distance 78 is 1 cm.

FIG. 8 is a front elevation view of one embodiment of a case 80 in an open position depicting various internal components and where the case 80 does not comprise or contain an electronic device. The case 80 may contain a first cover 82, hinges 84, a spine 85, and a second cover 83. Aforementioned support members 70 are shown in relation to additional case components. A device storage area 86 is provided, the device storage area 86 being generally bounded by support members 70 at one lateral end and one or more substantially rigid support members 87 at an opposing lateral end. Substantially rigid support members 87 are positioned to receive and secure a side or edge of a device, while support members 70 are provided to receive one or more corners of a device. In an embodiment, the substantially rigid support members 87 are positioned apart from one another to accommodate electronic devices with buttons on a side or on the face of the electronic device between the support members 87. In alternative embodiments, however the position of the substantially rigid support members 87 and support members 70 are varied. One or more substantially rigid support members 87 and one or more support members 70 can be provided at any number of locations. Preferably, however, one or more corners of a rectangular device is/are secured by at least one support member 87, 70.

In one embodiment, support members 70 are secured to the second cover 83 of the case 80 by brackets 71. Support members 70 may be secured to the case 80 by brackets 71 by one or more fasteners, such as screws or rivets, being threaded or inserted through the bracket 71 and fastened or secured to a portion of the case 80, such as the second cover 83. In such embodiments, elastic or bendable or pliable wire portions of the support member(s) 70 allow for user-manipulation of the member(s) 70, such that a device may be inserted into the member 70 and secured therein once the member 70 is released. For example, in one contemplated method and case, a device is secured within the device storage area 86 by inserting a first edge of the device within substantially rigid members 87. An opposing second edge of the device is then secured within the case 80 by deforming elastic support members 70 outwardly, placing the second edge flush with the storage area 86, and subsequently allowing the members 70 to engage and secure corners of the device under the members' own elasticity or restoring force.

In certain embodiments, support members 70 are biased by one or more features as shown and described herein. For example, in various embodiments, "J" or "U" shaped members 70 are provided in connection with biasing means, such as those described herein with respect to FIGS. 7A-9. In such embodiments, support members 70 comprise one of a pliable, stretchy, bendable, or elastic material and a substantially rigid material. It will be recognized that where adjustability is provided by biasing means, the need for a support member 70 as shown in FIG. 8 to be pliable is reduced. In alternate and additional embodiments, support members are loops 23, such as those described herein with respect to FIGS. 2-6.

The embodiments of the support members 70 as described in FIGS. 7A-8 may be attached, connected, interconnected, or secured to the protective case in a number of different ways. In some embodiments, the support members 70 are secured to the second cover 83 of the case 80 using elastic securing means, similar to the elastic securing means described in conjunction with FIGS. 1-6. Further, in some embodiments, the elastic securing means may comprise straps, connection members, support members 70, and stitching or glue. Additionally, an elastic securing means cover may be used in some embodiments. In some embodiments, the support members 70 may be secured to the second cover 83 of the case 80 using techniques similar to those described in conjunction with FIGS. 1-6. Other attachment or securing means known in the art may also be used in additional and alternate embodiments.

The embodiment of FIG. 8 is openable and closeable about primary hinges 84 or a spine 85. As shown in FIG. 8, a secondary hinge portion 84 is provided on a second cover 83, back cover, or device-receiving portion of the case 80. The combination of a spine 85, primary hinges 84, a secondary hinge 84, slot members 81, and a partially detached device storage area 86 permits a housed or stored device to be displayed in various positions. Alternatively, the slot members 81 may be replaced with a raised rail, clip, or hook and loop material (i.e., Velcro®) that operatively engages an edge of the top corner for selective engagement. In various embodiments, slot members 81 may be elongated recesses or indentations.

FIG. 9 further shows the secondary hinge 84b as dividing the back cover into two sections: a lower portion 83a of the second cover and an upper portion 83b of the second cover. In an embodiment, the device storage area 86 partially detaches or separates from the second cover 83 and temporarily rests in the slots 81 in the first cover 82 when the case 80 is in a "display" configuration. In an embodiment, the device storage area 86 may fully detach or separate from the lower portion 83a of the second cover and remain interconnected or attached to the upper portion 83b of the second cover. As shown in FIG. 9, selective rotation of primary hinges 84a and secondary hinge 84b allows a free end 92 of the storage area 86 to be temporarily positioned in an inclined position (i.e., "display" configuration), such as may be desirable for reading, typing, and the myriad activities that may be performed with the various electronic devices discussed herein. In an embodiment, the slots 81 may allow an electronic device to be displayed by a user at an obtuse angle relative to the first cover 82 or relative to a horizontal plane. Slot members 81 comprise ovoid depressions in an internal portion of the case cover 82 in the embodiment of FIGS. 8-9. Such slots 81 provide for various receiving areas in which a free end 92 of the storage area 86 is received in a position of use. Various alternative embodiments, however, contemplate alternative means for receiving a free end 92 of the storage area 86. For example, a free end 92 may be secured in an inclined position by one or more magnetic, hook-and-loop features (i.e., Velcro®), snaps, etc. In one embodiment, slot members 81 comprise projections, such projections providing raised features for resisting a gravitational force exerted upon free end 92 and thus propping or supporting the device storage area 86 and any related devices in one or more predetermined positions.

FIG. 10 is a front elevation view of one embodiment of a case 180 in an open position depicting various internal components and where the case 180 does not comprise or contain an electronic device. The case 180 may contain a first cover 182, hinges 184, a spine 185, and a second cover 183. Another embodiment of support members 170 are shown in relation to additional case components. A device storage area 186 is provided, the device storage area 186 being generally bounded by support members 170 at one lateral end and one or more substantially rigid support members 187 at an opposing lateral end. Substantially rigid support members 187 are positioned to receive and secure a side or edge of a device, while support members 170 are provided to receive one or more corners of a device. In an embodiment, the substantially rigid support members 187 are positioned apart from one another to accommodate electronic devices with buttons on a side or on the face of the electronic device between the support members 187. In alternative embodiments, however the position of the substantially rigid support members 187 and support members 170 are varied. One or more substantially rigid support members 187 and one or more support members 170 can be provided at any number of locations. Preferably, however, one or more corners of a rectangular device is/are secured by at least one support member 187, 170.

In certain embodiments, support members 170 are biased by one or more features as shown and described herein. For example, in various embodiments, "J" or "U" shaped members 170 are provided in connection with biasing means, such as those described herein with respect to FIGS. 10-11. In such embodiments, support members 170 comprise one of a pliable, stretchy, bendable, or elastic material and a substantially rigid material. It will be recognized that where adjustability is provided by biasing means, the need for a support member 170 as shown in FIG. 10 to be pliable is reduced. In alternate and additional embodiments, support members are loops 23, such as those described herein with respect to FIGS. 2-6.

The embodiments of the support members 170 as described in FIGS. 10-11 may be attached, connected, interconnected, or secured to the protective case in a number of different ways. In some embodiments, the support members 170 are secured to the second cover 183 of the case 180 using elastic securing means, similar to the elastic securing means described in conjunction with FIGS. 1-6. Further, in some embodiments, the elastic securing means may comprise straps, connection members, support members 170, and stitching or glue. Additionally, an elastic securing means cover may be used in some embodiments. In some embodiments, the support members 170 may be secured to the second cover 183 of the case 180 using techniques similar to those described in conjunction with FIGS. 1-6 or FIGS. 7A-9. Other attachment or securing means known in the art may also be used in additional and alternate embodiments.

In such embodiments, elastic or bendable or pliable wire portions of the support member(s) 170 allow for user-manipulation of the member(s) 170, such that a device may be inserted into the member 170 and secured therein once the member 170 is released. For example, in one contemplated method and case, a device is secured within the device storage area 186 by inserting a first edge of the device within substantially rigid members 187. An opposing second edge of the device is then secured within the case 180 by deforming elastic support members 170 outwardly, placing the second edge flush with the storage area 186, and subsequently allowing the members 170 to engage and secure corners of the device under the members' own elasticity or restoring force.

The embodiment of FIG. 10 is openable and closeable about primary hinges 184 or a spine 185. As shown in FIG. 10, a secondary hinge portion 184 is provided on a second cover 183, back cover, or device-receiving portion of the case 180. The combination of a spine 185, primary hinges 184, a secondary hinge 184, slot members 181, and a partially detached device storage area 186 permits a housed or stored device to be displayed in various positions. Alternatively, the slot members 181 may be replaced with a raised rail, clip, or hook and loop material (i.e., Velcro®) that operatively engages an edge of the top corner for selective engagement. In various embodiments, slot members 181 may be elongated recesses or indentations.

FIG. 11 further shows the secondary hinge 184b as dividing the back cover into two sections: a lower portion 183a of the second cover and an upper portion 183b of the second cover. In an embodiment, the device storage area 186 partially detaches or separates from the second cover 183 and temporarily rests in the slots 181 in the first cover 182 when the case 180 is in a "display" configuration. In an embodiment, the device storage area 186 may fully detach or separate from the lower portion 183a of the second cover and remain interconnected or attached to the upper portion 183b of the second cover. As shown in FIG. 11, selective rotation of primary hinges 184a and secondary hinge 184b allows a free end 192 of the storage area 186 to be temporarily positioned in an inclined position (i.e., "display" configuration), such as may be desirable for reading, typing, and the myriad activities that may be performed with the various electronic devices discussed herein. In an embodiment, the slots 181 may allow an electronic device to be displayed by a user at an obtuse angle relative to the first cover 182 or relative to a horizontal plane. Slot members 181 comprise ovoid depressions in an internal portion of the case cover 182 in the embodiment of FIGS. 10-11. Such slots 181 provide for various receiving areas in which a free end 192 of the storage area 186 is received in a position of use. Various alternative embodiments, however, contemplate alternative means for receiving a free end 192 of the storage area 186. For example, a free end 192 may be secured in an inclined position by one or more magnetic, hook-and-loop features (i.e., Velcro®), snaps, etc. In one embodiment, slot members 181 comprise projections, such projections providing raised features for resisting a gravitational force exerted upon free end 192 and thus propping or supporting the device storage area 186 and any related devices in one or more predetermined positions.

While various embodiments of the present invention have been described in detail, it is apparent that modifications and alterations of those embodiments will occur to those skilled in the art. However, it is to be expressly understood that such modifications and alterations are within the scope and spirit of the present invention. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A protective case for retaining, displaying, and storing an electronic device, comprising:
    a first cover portion;
    a second cover portion hingedly interconnected to said first cover portion, said second cover portion comprising a substantially rigid planar member;
    said second cover portion operable to selectively receive an electronic device, said second cover portion comprising a plurality of support members operable to secure a corner or edge of an electronic device;
    each of said plurality of support members respectively interconnected to a respective elastic biasing member; and
    each of said elastic biasing members interconnected to and in force-transmitting communication with said second cover portion, said elastic biasing members retaining the electronic device in a secure position on said second cover portion, wherein said elastic biasing members convey a biasing force to the electronic device to bias the electronic device against said support members.

2. The protective case of claim 1, wherein said second cover portion comprises a hinge, and wherein said second cover portion can be selectively inclined at a predetermined angle with respect to said first cover portion.

3. The protective case of claim 1, wherein said support members are each configured to receive a corner of the electronic device.

4. The protective case of claim 1, wherein said protective case comprises at least two support members.

5. The protective case of claim 1, wherein said support members comprise pliable wire members.

6. The protective case of claim 1, wherein said first cover portion comprises at least one of a plurality of channels and a plurality of raised ridges for selectively engaging a lateral edge of said second cover portion to provide selective positioning of said second cover portion.

7. The protective case of claim 6, wherein a first channel of said plurality of channels corresponds to a first angle of said second cover portion with respect to said first cover portion, and wherein a second channel of said plurality of channels corresponds to a second angle of said second cover portion with respect to said first cover portion.

8. A protective case for retaining, displaying, and storing an electronic device, comprising:
    a first cover portion;
    a second cover portion hingedly interconnected to said first cover portion, said second cover portion comprising a substantially rigid planar member, an upper end, and a lower end;
    said second cover portion comprising a plurality of support members for receiving and supporting an electronic device in at least one orientation; and
    a respective elastic member respectively interconnected to each of said plurality of support members and to an interior portion of said second cover portion, the elastic members operable to apply a biasing force to the support members and the electronic device;
    wherein at least two of said plurality of support members are provided at opposing ends of the electronic device; and
    wherein said second cover portion comprises a hinge member such that a portion of said second cover portion is rotatable with respect to said first cover portion; and
    wherein an interior portion of said first cover portion comprises at least one of a channel and a raised ridge for selectively contacting a lateral edge of said second cover portion at an angle relative to said first cover portion to provide selective positioning of said second cover portion.

9. The protective case of claim 8, further comprising a plurality of at least one of channels and raised ridges for selectively contacting a lateral edge of said second cover portion.

10. The protective case of claim 8, wherein the case is selectively positionable in at least a closed position, an open position, and an angled position of use.

11. The protective case of claim 8, wherein said second cover portion is rotatable with respect to said first cover portion about at least two parallel axes of rotation.

12. The protective case of claim 8, wherein said second cover portion comprises a hinge, and wherein said second cover portion can be selectively inclined at a predetermined angle with respect to said first cover portion.

13. The protective case of claim 8, wherein said plurality of support members comprises four support members.

14. The protective case of claim 8, wherein said plurality of support members comprise at least one of a non-abrasive material, a non-slip material, a scratch-resistant material, and a polyurethane coating.

15. A method for securing and using a tablet electronic device within a portable storage case comprising:
    providing said portable storage case with a first cover portion hingedly interconnected to a second cover portion, said second cover portion comprising:
        a substantially rigid planar member;
        at least one support member interconnected to said second cover portion by an elastic member for supporting the tablet electronic device and resisting movement of the tablet electronic device in at least one direction, the elastic member operable to apply a force to an interior portion of said second cover portion and said at least one support member; and
        said at least one support member adapted to receive a corner of the tablet electronic device such that said elastic member and said at least one support member provide a force to secure the electronic tablet device;
    placing a corner of the tablet electronic device in force-transmitting communication with said at least one support member;
    placing a back surface of the tablet electronic device substantially flush with said second cover portion.

16. The method of claim 15, wherein said portable storage case comprises at least two biasing members in force-transmitting communication with said second cover portion.

17. The method of claim 15, wherein an interior portion of said first cover portion comprises at least one of a channel and a raised ridge for selectively receiving a peripheral edge of said second cover portion to selectively adjust an angle of said second cover portion relative to said first cover portion.

18. The method of claim 17, further comprising placing an edge portion of the tablet electronic device in the at least one of a channel and a raised ridge.

19. The method of claim 15, further comprising rotating said hinge and providing an edge of said second cover portion at an obtuse angle relative to said first cover portion.

20. The method of claim 15, wherein said at least one support member comprises a hook adapted to engage a corner of the tablet electronic device, said hook interconnected to an elastic strap interconnected to said second cover portion.

* * * * *